T. Gladding,
Salt Trough.
No. 86,066. Patented Jan. 19, 1869.
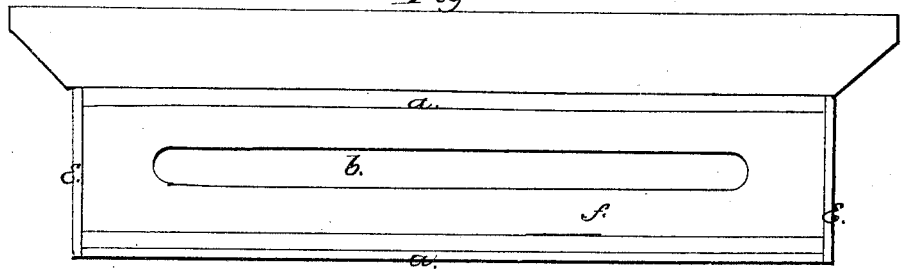
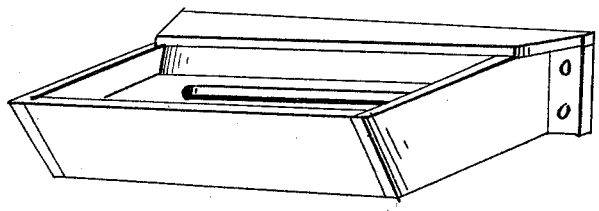
Witnesses:
C. M. Bliss
J. W. Bliss
Inventor:
Timothy Gladding

TIMOTHY GLADDING, OF EAST BERLIN, CONNECTICUT.

*Letters Patent No. 86,066, dated January 19, 1869.*

IMPROVEMENT IN SALT-TROUGHS FOR CATTLE.

The Schedule referred to in these Letters Patent and making part of the same.

*To all whom it may concern:*

Be it known that I, TIMOTHY GLADDING, of East Berlin, county of Hartford, and State of Connecticut, have invented certain new and useful Improvements in Salt-Trough for Cattle; and to enable others skilled in the art to make and use the same, I will proceed to describe its construction by referring to the drawings, in which the same letters indicate like parts in each of the figures.

The nature of this invention consists of a trough or box, provided with a perforated intermediate division between the bottom and the top of the box, through which the animal can lap up salt without the liability of waste.

Its object is to provide a safe deposit of salt, convenient of access by animals at all times, and prevent waste thereof, and thereby secure a better state or condition of health than can be expected where salt is dealt out to them only occasionally, thus providing means whereby the animal can supply itself according to the dictates of instinct.

In the accompanying drawings—

Figure 1 is a top view of my invention;

Figure 2 is a cross-section or end view; and

Figure 3, a perspective view.

This trough or box may be made of any desirable form, length, breadth, or depth, as desirable.

$a$ are sides of the box.

$b$ is the bottom.

$e$, the ends.

$f$ is a perforated division between the bottom, $b$, and the top edge of the box.

This bottom, $b$, is perforated, so that the animal can insert its tongue through said perforations or perforation, (more than one, if desirable,) and lap salt to its satisfaction, and while doing so, the drip or waste will fall into the upper portion of the box.

Thus the health of the animals can be greatly promoted, and the ailing which so greatly prevails among them may be avoided.

What I claim, therefore, and desire to secure by Letters Patent, is—

The perforated diaphragm $f$, when constructed as described, in combination with a trough, as specified.

TIMOTHY GLADDING. [L. S.]

Witnesses:
E. W. BLISS,
J. W. BLISS.